(12) United States Patent
Balla

(10) Patent No.: US 6,894,256 B2
(45) Date of Patent: May 17, 2005

(54) APPARATUS IN THE PRODUCTION OF A PACKAGE OR A PACKAGING MATERIAL

(75) Inventor: Gyula Balla, Malmö (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 43 days.

(21) Appl. No.: 10/470,892

(22) PCT Filed: Jan. 31, 2002

(86) PCT No.: PCT/SE02/00172

§ 371 (c)(1),
(2), (4) Date: Aug. 1, 2003

(87) PCT Pub. No.: WO02/060759

PCT Pub. Date: Aug. 8, 2002

(65) Prior Publication Data

US 2004/0060928 A1 Apr. 1, 2004

(30) Foreign Application Priority Data

Feb. 2, 2001 (SE) .............................. 0100318

(51) Int. Cl.⁷ .............................. H05B 6/10; H05B 6/40
(52) U.S. Cl. .................. 219/633; 219/670; 219/672; 219/676; 156/379.6
(58) Field of Search ................. 219/633, 634, 219/670, 672, 676, 673; 156/274.2, 379.6, 380.2

(56) References Cited

U.S. PATENT DOCUMENTS

| | | | |
|---|---|---|---|
| 3,941,643 A | 3/1976 | Balla | |
| 4,032,740 A | * 6/1977 | Mittelmann | 219/667 |
| 4,060,443 A | 11/1977 | Balla | |
| 4,376,399 A | * 3/1983 | Victor | 83/13 |
| 4,430,543 A | 2/1984 | Olofsson | |
| 4,521,659 A | * 6/1985 | Buckley et al. | 219/633 |
| 4,560,567 A | 12/1985 | Rausing | |
| 4,585,498 A | 4/1986 | Lagerstedt et al. | |
| 4,589,591 A | 5/1986 | Sjostrand et al. | |
| 4,704,509 A | 11/1987 | Hilmersson et al. | |
| 4,707,213 A | 11/1987 | Mohr et al. | |
| 4,731,250 A | 3/1988 | Stark | |
| 4,782,643 A | 11/1988 | Stark | |
| 4,789,767 A | * 12/1988 | Doljack | 219/605 |
| 4,818,313 A | 4/1989 | Sundberg | |
| 4,820,892 A | 4/1989 | Holmstrom et al. | |
| 4,908,091 A | 3/1990 | Traegaardh et al. | |
| 5,001,319 A | 3/1991 | Holmstrom | |
| 5,025,123 A | 6/1991 | Pfaffmann et al. | |
| 5,052,994 A | 10/1991 | Aeschlilmann | |
| 5,069,021 A | 12/1991 | Reil et al. | |
| 5,074,099 A | 12/1991 | Andersson et al. | |
| 5,113,479 A | 5/1992 | Anderson et al. | |
| 5,142,843 A | 9/1992 | Reil et al. | |
| 5,261,157 A | * 11/1993 | Chang | 29/844 |
| 5,288,361 A | 2/1994 | Konno | |
| 5,288,448 A | 2/1994 | Andersson | |
| 5,374,809 A | * 12/1994 | Fox et al. | 219/633 |
| 5,385,294 A | 1/1995 | Andersson et al. | |
| 6,167,681 B1 | 1/2001 | Yano et al. | |
| 6,178,719 B1 | 1/2001 | Hansen | |

* cited by examiner

Primary Examiner—Philip H. Leung
(74) Attorney, Agent, or Firm—Burns, Doane, Swecker & Mathis, L.L.P.

(57) ABSTRACT

An apparatus in the production of a package or a packaging material comprising at least one metal layer and one polymer layer, the apparatus including an inductor connectable to a high frequency current source. According to the invention, said inductor includes a core (1) of a ferromagnetically conductive material, the core displaying two shanks (5a, 5b) with an air gap (6) between a first respective end of these shanks (5a, 5b), as well as an arc section (7) which interconnects a second respective end of the two shanks (5a, 5b) with each other for conducting a magnetic flow (8) between the shanks, the arc section (7) displaying an electrically conductive coil (2) wound around same, the coil displaying connection points (3a, 3b, 11a, 11b, 11c) for said high frequency current source (4).

40 Claims, 3 Drawing Sheets

APPARATUS IN THE PRODUCTION OF A PACKAGE OR A PACKAGING MATERIAL

FIELD OF THE INVENTION

The present invention relates to an apparatus for utilisation in the production of a package or a packaging material comprising at least one metal layer and one polymer layer, the apparatus including an inductor connectable to a high frequency current source.

BACKGROUND OF THE INVENTION

It has long been known within the packaging industry to employ packaging materials including outer layers of thermoplastic, which outer layers may be sealed to one another by fusion after heating and compression, for obtaining tight and durable sealing joints. The packaging material may thus, after forming, e.g. by folding or other means, be caused to retain its given configuration in that the outer layers of the packaging material are brought into abutment against one another and sealed to one another. One form of package production which has come into considerable use resides in the concept that a web of a packaging material (packaging laminate), comprising a core layer of paper or paperboard, a metal layer (normally aluminium) and layers of thermoplastic disposed outermost, is formed into a tube by the longitudinal edges of the web being brought together to one another in an overlap joint, whereafter the web edges are sealed to one another. The thus formed tube may then be filled with the contemplated contents, e.g. a liquid, whereafter the tube filled with liquid may be divided into individual containers by transverse sealing of the tube along narrow zones which are applied at uniform spacing from each other. The sealed tube sections can, prior to or in connection with the transverse sealing, be given a permanent configuration, e.g. a parallelepipedic configuration, by folding of the material, whereafter the closed tube sections can be separated from the remainder of the tube and form an individual, finished consumer package.

It is known to facilitate the sealing of the packaging material by utilising an inductor which consists of an electric conductor to which the desired form has been imparted and which forms one or more coil turns and which is connected to a current source which supplies the coil with high frequency alternating current. When this high frequency alternating current is led through the coil or inductor, a high frequency magnetic field occurs around it, and when the coil is placed adjacent a material containing a metal layer, induction currents are induced in this metal layer, which give rise to thermal energy in those parts of the metal layer which lie proximal the coil. By the generated heat, a layer of thermoplastic material, e.g. polyethylene, lying adjacent the metal layer will soften or melt. When two such layers of thermoplastic material are compressed against each other, the thermoplastic layers, in the region of the heating, will fuse together for the formation of a tight and durable joint. The width of the joint will, in this instance, be as wide as the coil wire/inductor conductor which abuts against the packaging material.

Prior art apparatuses for induction sealing of strips and longitudinal joints certainly function well, but in, for example, the development of high speed output machines, there is room for improvement in particular because of problems relating to the compression and the time which is required for the sealing operation. There is also a need in the art for a sealing apparatus which may be utilised for the spot heating of a clearly defined area, preferably on a moving material web. Also in connection with the development of opening arrangements for packages, there is a need for a sealing apparatus which may be utilised for spot heating.

Another problem in connection with the production of packages or packaging laminates is to be able to remove loose material, so called confetti, when an emptying hole is prefabricated through which the package is intended to be emptied of its contents. In such instance, a prefabricated emptying hole is made only partly, by means of incision lines through the packaging laminate, from the one side of the laminate, i.e. through a paper or paperboard web coated with a liquid-tight coating, but not through a subjacent metal foil. The problem in such instance is to be able, in a thoroughly controlled manner, to remove the formed parts of the coated paper or paperboard, i.e. the confetti, located inside the incision lines and which are still laminated to the metal foil. The technique for making prefabricated emptying holes is described in the applicant's copending patent application SE-AO-9903315, whose contents are hereby incorporated by reference.

SUMMARY OF THE INVENTION

The object of the present invention is to disclose an improved apparatus for utilisation in the production of a package or a packaging material comprising at least one metal layer and a polymer layer, the apparatus including an inductor connectable to a high frequency current source. In particular, the present invention has for its object to overcome or obviate the above-mentioned problems and thereby disclose an improved apparatus for induction sealing of, for example, longitudinal joints, strips, opening arrangements etc., which can be utilised for continuous sealing, but which also makes for spot heating. In addition, the present invention has for its object particularly to disclose an apparatus for induction heating of a prefabricated emptying hole in a packaging material, so that a confetti of paper or paperboard may be blistered free from a metal layer, normally an aluminium foil layer, against which it is laminated. In such instance, it is also an object of the present invention to gain ready access to this confetti with a tool, e.g. a vacuum tool, for removing it, at the same time as the induction apparatus is placed at the prefabricated emptying hole.

These and other objects will be attained by exemplary embodiments of the present invention described herein.

In particular, the apparatus according to the present invention is based on the inventive concept that the coil proper of the inductor need not necessarily abut against or even be disposed to lie close to the packaging material in which it is induce current. Instead, a ferromagnetic concentrator is advantageously utilised according to the present invention which leads the electromagnetic field to a position proximal the packaging material or in abutment thereto. According to one preferred embodiment of the invention, this ferromagnetic concentrator/core is moreover designed so that it concentrates the electromagnetic field in an air gap between two shanks, which implies that a considerable electromagnetic field may occur in a position where the inductor does not directly abut against the packaging material. This is of particular advantage when it is necessary to gain access to the packaging material with a device, e.g. a (vacuum) tool or the like for removing, for instance, a confetti. Thanks to the air gap with the electromagnetic field, the interesting part of the packaging material is accessible from both sides.

The apparatus according to the present invention moreover displays at least the advantages that there will be obtained a highly uniform thermal image in the metal layer of the packaging material, that it is possible to achieve an extremely high degree of efficiency by adapting the winding of the coil, in particular the number of turns which this is wound, and by a capacitor for setting resonance frequency, and that no extra transformer for the apparatus is normally required.

BRIEF DESCRIPTION OF THE DRAWINGS

The present invention will now be described in greater detail hereinbelow, with reference to a number of preferred embodiments and to the accompanying Drawings, in which.

DETAILED DESCRIPTION OF THE INVENTION

Figure 1:
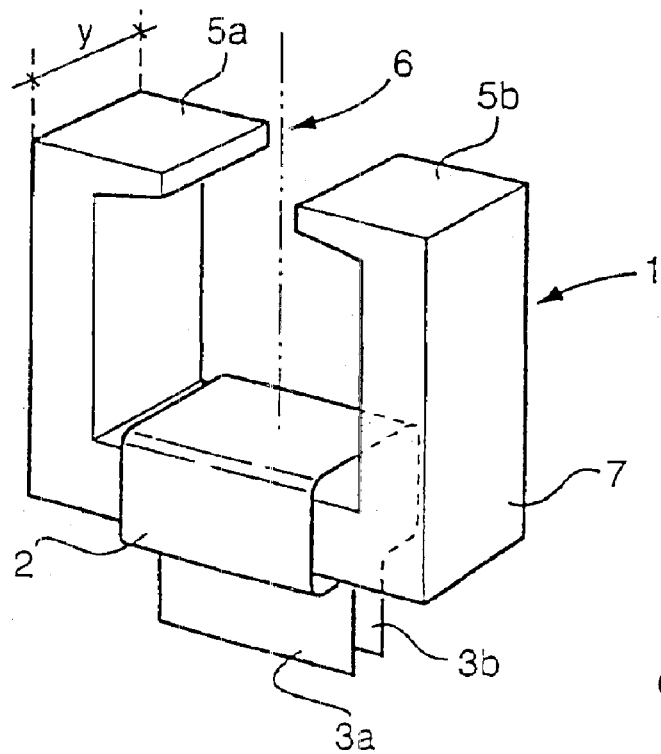
FIG. 1 shows one embodiment of an apparatus according to the present invention, seen from the side in perspective.
Figure 2:
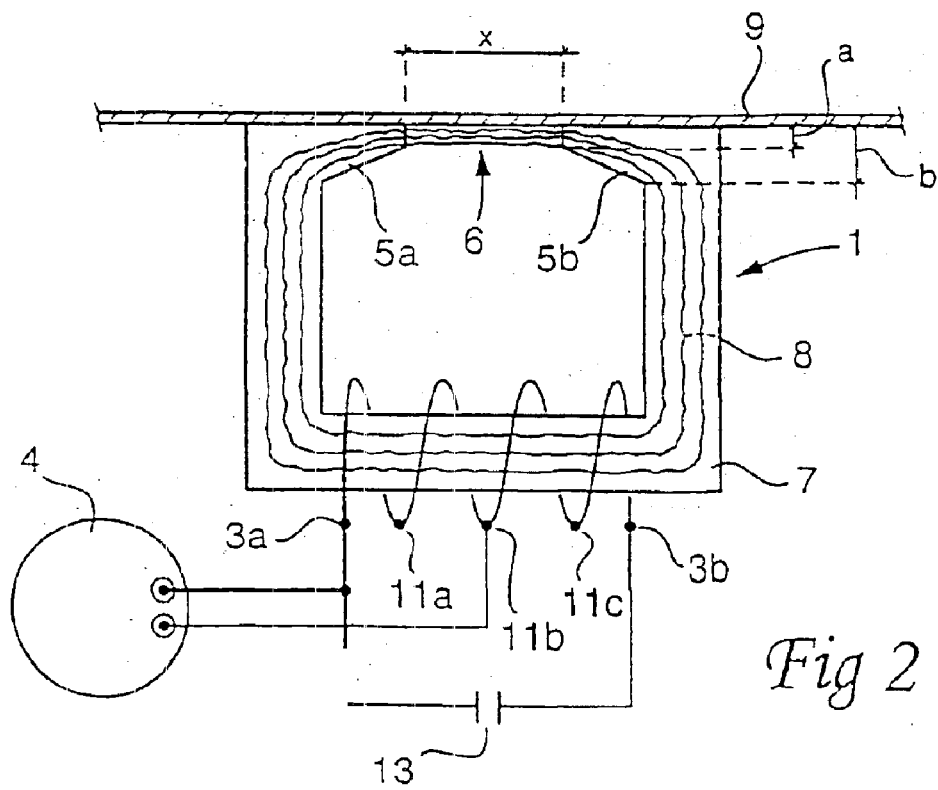
FIG. 2 shows the apparatus according to FIG. 1 seen from the side and abutting against a packaging material.

FIGS. 1 and 2 show an apparatus according to the present invention comprising a concentrator/core 1 of a ferromagnetically conductive material, which preferably includes a permeability of $\mu r$ 500–8,000, and even more preferably $\mu r$ 2,000–8,000, as well as a winding 2 of an electrically conductive material, e.g. copper or silver, which includes connection points 3a, 3b, 11a, 11b, 11c for a high frequency current source/generator 4.

The embodiment of the core 1 shown in FIGS. 1 and 2 is designed as a U with two shanks 5a, 5b which point in towards the centre line and are disposed at the ends of the U. Between a first end of a first shank 5a pointing in towards the centre line and a first end of a second, mirror-reversed shank 5b pointing in towards the centre line, there is an air gap 6. This air gap 6 normally is of a length x of at least 5 mm, preferably at least 10 mm, but less than 50 mm, preferably less than 40 mm and even more preferably less than 30 mm, seen in a direction of extent of said air gap 6 between the first respective ends of said shanks 5a and 5b. Said shanks moreover normally display a width y of least 10 mm, but, according to a first preferred embodiment, less than 50 mm, preferably less than 40 mm and even more preferably less than 30 mm, seen in a direction of extent of extent at right angles to the direction of extent of said air gap 6, between the first respective ends of said shanks 5a and 5b, i.e. corresponding to the width of the core 1. However, according to a second embodiment, the width y may be as much as up to 200 mm, but preferably at most 150 mm. This second embodiment may, for example, conceivably be used in connection with the sealing of longitudinal joints etc.

The second ends of the shanks 5a, 5b, i.e. those which face outwards from the centre line, are connected by an arc section 7 of the core of ferromagnetic material. This arc section 7 normally displays the same width (y) as the shanks 5a, 5b.

The shanks 5a, 5b further display a tapering cross section, seen in a direction from their respective second ends towards their respective first ends, a thickness a of said first end of a shank being in relation to a thickness b of said second end of this shank in such a manner that b/10<a<b/2, preferably b/5<a<b/3. Thanks to the tapering cross section towards the air gap 6, there will be obtained a concentration of the magnetic flow 8 in the air gap 6, as indicated in FIG. 2.

Figure 3:
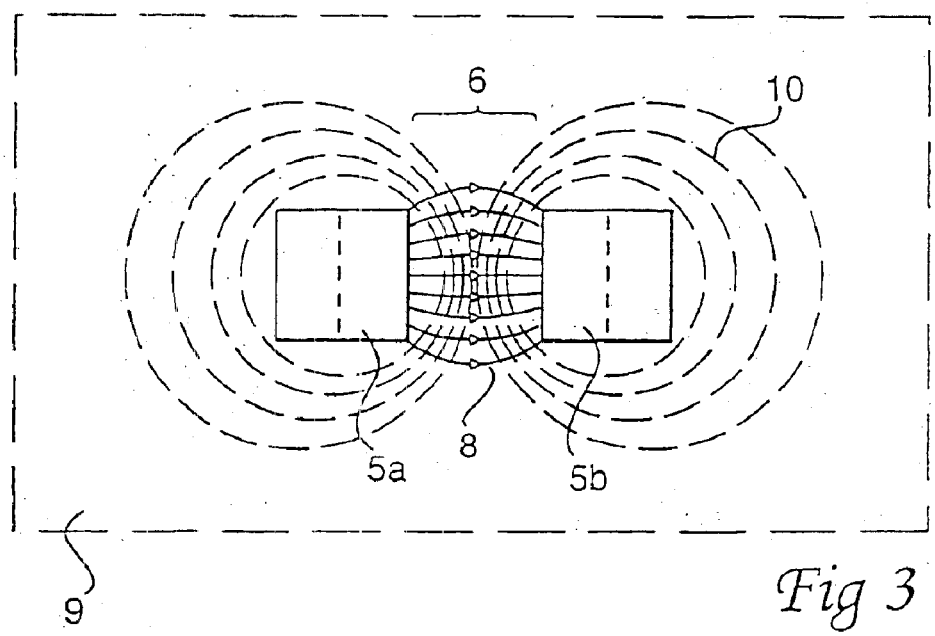
FIG. 3 shows induced current circles in the metal layer of a packaging laminate with an inductor according to the present invention disposed thereunder, seen from above.

In order that the apparatus may be placed closely adjacent, abutting against, or urging against a planar packaging material 9 which includes a metal layer and a polymer layer, said shanks 5a, 5b are provided with planar outer defining surfaces which are disposed in one and the same plane with each other, or arched (convex or concave) outer defining surfaces which are disposed to follow one and the same imaginary arc of a circle (e.g. a drum or roller). The normal placing of the apparatus in relation to the packaging laminate 9 is apparent from FIG. 2. At the air gap 6, a current is induced in the metal layer of the packaging laminate in the manner which is apparent from FIG. 3, which thus shows induced current circles 10 in the metal layer of a packaging laminate 9 with an inductor according to the present invention disposed thereunder, seen from above. At a position corresponding to the air gap 6, these current circles are concentrated, heat being generated in the metal layer of the packaging laminate 9. From the point of view of induction, it is of less or no consequence in which direction the packaging material 9 is turned, i.e. whether its metal layer (aluminium foil) is turned to face the induction apparatus, or whether it is turned to face away from it, with, for example, a core layer of paper or paperboard between the metal layer and the induction apparatus. On spot heating, a stay time of 30–500 milliseconds is normally required, preferably 40–300 milliseconds.

Figure 4:
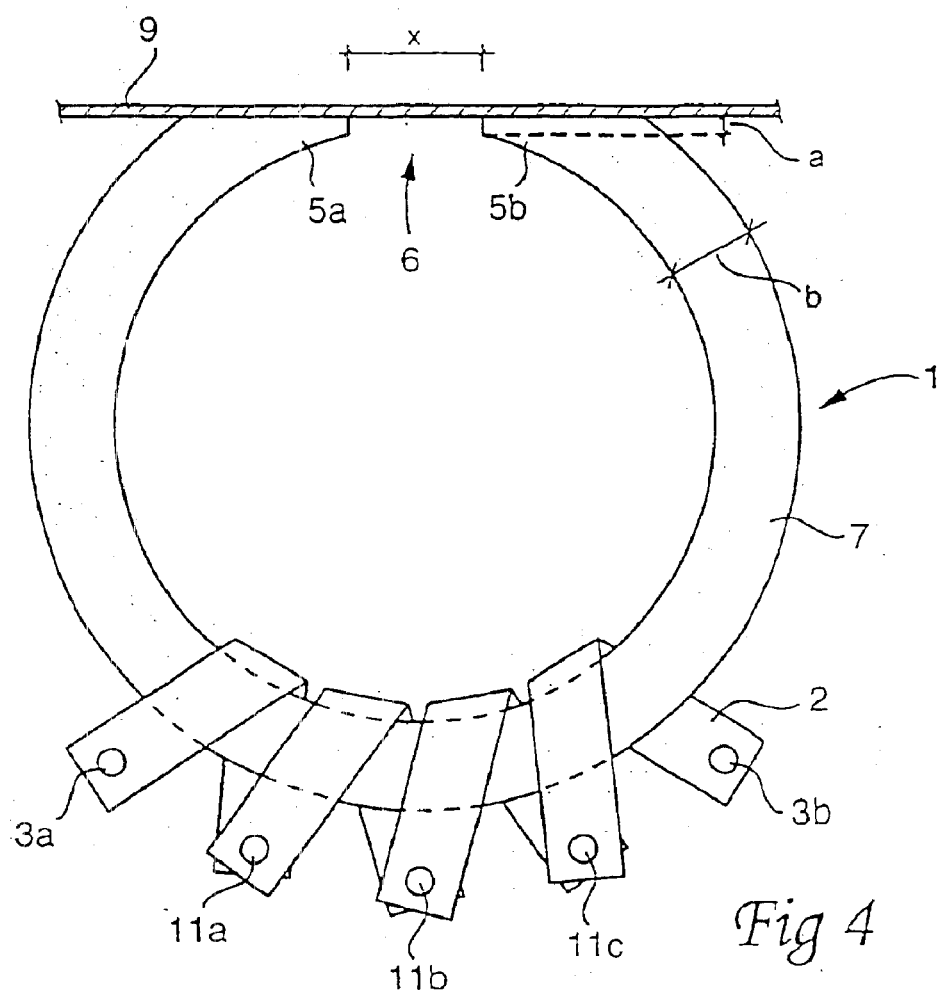
FIG. 4 shows one preferred apparatus according to the present invention seen from the side and abutting against a packaging material.

FIG. 4 shows how the apparatus may be built up with a core 1 which is formed as a toroid, i.e. with an arc section 7 which follows an arc of a circle, with an upper region bevelled to a planar outer defining surface of two shanks 5a, 5b and with an air gap 6 therebetween. An outer, maximum dimension of the core 1, corresponding to an outer diameter in FIG. 4, is suitably 60–150 mm, preferably 80–120 mm, while an inner dimension of the core 1, corresponding to an inner diameter in FIG. 4, is 20–40 mm less than the outer dimension.

In the apparatus according to the present invention, the coil 2 is advantageously wound around the arc section 7 of the core 1, which implies that it need not be disposed for abutment against the packaging material or even close to it. The coil 2 may be disposed in a plurality of different ways, it however preferably displaying 1–10 turns, preferably 2–8 turns and even more preferably 2–6 turns around the arc section 7 of the core 1. FIG. 1 shows how the coil 2 is formed from a single turn of a metal strip of e.g. copper or silver, while FIG. 2 shows how the coil 2 is formed from four turns of copper or silver wire or socalled Litz-wire. FIG. 4 shows how the coil may be formed from, e.g. four separate metal strips which are each wound one turn around the arc section 7 of the core and interconnected in connection points 11a, 11b, 11c into a whole coil with, in the illustrated case, four turns. Typically, the metal strips are roughly 20 mm wide and display a thickness of about 0.5 mm. The free, outer ends of the outermost metal strip display connection points/connections 3a, 3b for a capacitor. An external, high frequency current source (shown in FIG. 2) may be connected between two of the connection points 3a, 3b, 11a, 11b, 11c, depending upon impedance.

Figure 5:
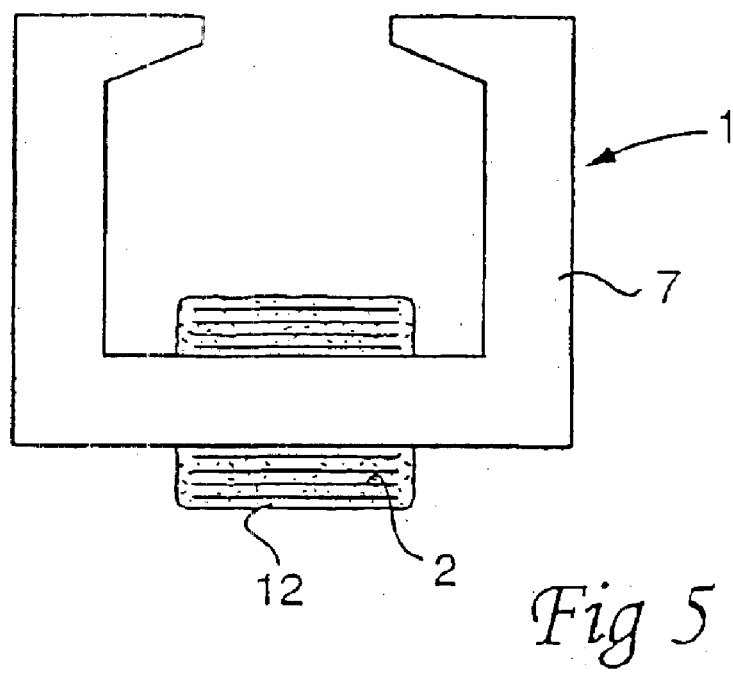
FIG. 5 shows an alternative method of winding the coil in an apparatus corresponding to that illustrated in FIG. 1, seen in cross section through the core and the coil.
Figure 6:
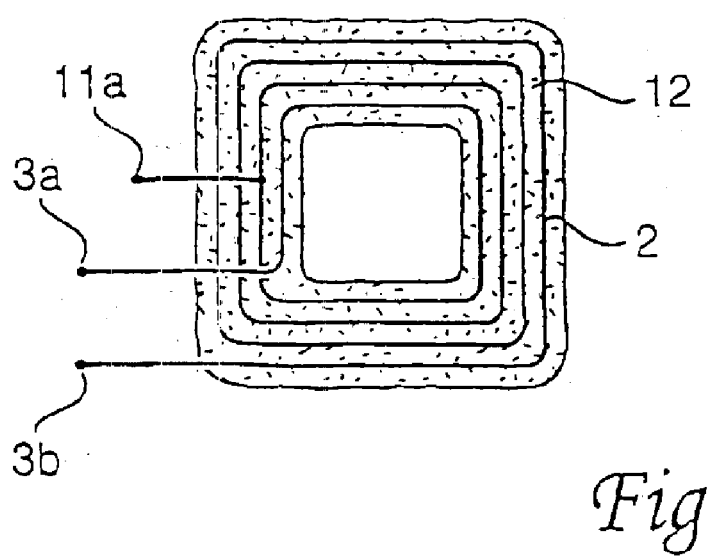
FIG. 6 shows the coil according to FIG. 1 seen from the side in cross section, without core.

FIGS. 5 and 6 show yet a further method of realising a coil 2 with several turns. Here, a metal strip which corresponds to the total width of the coil has been wound in mutually superjacent turns, with insulation 12 between them. From an inner end of the metal strip, a narrow strand has been drawn out through a small hole in the superjacent layers of metal strip, so that two connection points 3a, 3b for the coil 2 have been realised. In FIG. 2, but valid for all embodiments, it is shown how the connection points 3a, 3b of the coil 2 are coupled to a capacitor 13 and how two of the connection points 3a, 3b, 11a, 11b, 11c of the coil 2 are connected to a high frequency generator 4. The frequency utilized is typically 100–1,000 kHz, preferably 200–600 kHz.

The present invention is not restricted to the illustrated embodiments, but may be modified without departing from the scope of the appended Claims.

What is claimed is:

1. An apparatus in the production of a package or a packaging material comprising at least one metal layer and one polymer layer, the apparatus including an inductor connectable to a high frequency current source, wherein said inductor includes a core of a ferromagnetically conductive material, the core including two shanks with an air gap between a first respective end of these shanks and an arc section which interconnects a second respective end of the two shanks to each other for conducting a magnetic flow between the shanks, said arc section including an electrically conductive coil wound around same, wherein the coil includes connection points for said high frequency current source and is formed by metal strips, each strip having a width greater than a thickness of the strip and each strip forming a single turn, wherein adjacent strips are electrically connected via a connection point.

2. The apparatus as claimed in claim 1, wherein said shanks have a width of at least 10 mm, but less than 50 mm, seen in a direction of extent at right angles to a direction of extent of said air gap between the first respective ends of said shanks.

3. The apparatus as claimed in claim 2, wherein said shanks have a width less than 40 mm, seen in a direction of extent at right angles to a direction of extent of said air gap between the first respective ends of said shanks.

4. The apparatus as claimed in claim 3, wherein said shanks have a width less than 30 mm, seen in a direction of extent at right angles to a direction of extent of said air gap between the first respective ends of said shanks.

5. The apparatus as claimed in claim 1, wherein said shanks have a width of least 10 mm, and at most 200 mm, seen in a direction of extent at right angles to a direction of extent of said air gap between the first respective ends of said shanks.

6. The apparatus as claimed in claim 5, wherein said shanks have a width of at most 150 mm, seen in a direction of extent at right angles to a direction of extent of said air gap between the first respective ends of said shanks.

7. The apparatus as claimed in claim 1, wherein said air gap has a length of at least 5 mm, and less than 50 mm, seen in a direction of extent of said air gap between the first respective ends of said shanks.

8. The apparatus as claimed in claim 7, wherein said air gap has a length less than 40 mm, seen in a direction of extent of said air gap between the first respective ends of said shanks.

9. The apparatus as claimed in claim 8, wherein said air gap has a length less than 30 mm, seen in a direction of extent of said air gap between the first respective ends of said shanks.

10. The apparatus as claimed in claim 1, wherein said shanks are provided with planar outer defining surfaces which are disposed in one and the same plane or with arched outer defining surfaces which are disposed to follow one and the same imaginary arc of a circle.

11. The apparatus as claimed in claim 1, wherein said shanks have a tapering cross section, seen in a direction from their respective second ends towards their respective first ends, a thickness a of said first end of a shank being in relation to a thickness b of said second end of this shank such that $b/10<a<b/2$, for concentrating the magnetic flow in the air gap.

12. The apparatus as claimed in claim 11, wherein said shanks have a tapering cross section, seen in a direction from their respective second ends towards their respective first ends, a thickness a of said first end of a shank being in relation to a thickness b of said second end of this shank such that $b/5<a<b/3$, for concentrating the magnetic flow in the air gap.

13. The apparatus as claimed in claim 1, wherein said core is designed so that the arc section follows an arc of a circle.

14. The apparatus as claimed in claim 1, wherein said ferromagnetically conductive material in the core has a permeability of $\mu r$ 500–8,000.

15. The apparatus as claimed in claim 14, wherein said ferromagnetically conductive material in the core has a permeability of $\mu r$ 2,000–8,000.

16. Apparatus as claimed in claim 1, wherein said coil is wound 1–10 turns around the arc section of the core.

17. The apparatus as claimed in claim 16, wherein said coil is wound 2–8 turns around the arc section of the core.

18. The apparatus as claimed in claim 17, wherein said coil is wound 2–6 turns around the arc section of the core.

19. The apparatus as claimed in claim 1, wherein said coil comprises a metal strip or a wire, which is formed into a coil around the arc section of the core.

20. The apparatus as claimed in claim 19, wherein said coil includes copper or silver.

21. An apparatus in the production of a package or a packaging material comprising at least one metal layer and one polymer layer, the apparatus including an inductor connectable to a high frequency current source, wherein
said inductor includes a core of a ferromagnetically conductive material,
the core including two shanks with an air gap between a first respective end of these shanks and an arc section which interconnects a second respective end of the two shanks to each other for conducting a magnetic flow between the shanks, said arc section including an electrically conductive coil wound around same,
wherein the coil includes connection points for said high frequency current source and is formed by a metal strip wound in mutually superjacent turns around the core with insulation between the mutually adjacent turns and a first conductor connected between a first end of the metal strip and one of the connection points, the first conductor passing through a hole in the superjacent layers of the strip.

22. The apparatus as claimed in claim 21, wherein said shanks have a width of at least 10 mm, but less than 50 mm, seen in a direction of extent at right angles to a direction of extent of said air gap between the first respective ends of said shanks.

23. The apparatus as claimed in claim 22, wherein said shanks have a width less than 40 mm, seen in a direction of extent at right angles to a direction of extent of said air gap between the first respective ends of said shanks.

24. The apparatus as claimed in claim 23, wherein said shanks have a width less than 30 mm, seen in a direction of extent at right angles to a direction of extent of said air gap between the first respective ends of said shanks.

25. The apparatus as claimed in claim 21, wherein said shanks have a width of least 10 mm, and at most 200 mm, seen in a direction of extent at right angles to a direction of extent of said air gap between the first respective ends of said shanks.

26. The apparatus as claimed in claim 25, wherein said shanks have a width of at most 150 mm, seen in a direction of extent at right angles to a direction of extent of said air gap between the first respective ends of said shanks.

27. The apparatus as claimed in claim 21, wherein said air gap has a length of at least 5 mm, and less than 50 mm, seen in a direction of extent of said air gap between the first respective ends of said shanks.

28. The apparatus as claimed in claim 27, wherein said air gap has a length less than 40 mm, seen in a direction of extent of said air gap between the first respective ends of said shanks.

29. The apparatus as claimed in claim 28, wherein said air gap has a length less than 30 mm, seen in a direction of extent of said air gap between the first respective ends of said shanks.

30. The apparatus as claimed in claim 21, wherein said shanks are provided with planar outer defining surfaces which are disposed in one and the same plane or with arched outer defining surfaces which are disposed to follow one and the same imaginary arc of a circle.

31. The apparatus as claimed in claim 21, wherein said shanks have a tapering cross section, seen in a direction from their respective second ends towards their respective first ends, a thickness a of said first end of a shank being in relation to a thickness b of said second end of this shank such that b/10<a<b/2, for concentrating the magnetic flow in the air gap.

32. The apparatus as claimed in claim 31, wherein said shanks have a tapering cross section, seen in a direction from their respective second ends towards their respective first ends, a thickness a of said first end of a shank being in relation to a thickness b of said second end of this shank such that b/5<a<b/3, for concentrating the magnetic flow in the air gap.

33. The apparatus as claimed in claim 21, wherein said core is designed so that the arc section follows an arc of a circle.

34. The apparatus as claimed in claim 21, wherein said ferromagnetically conductive material in the core has a permeability of $\mu r$ 500–8,000.

35. The apparatus as claimed in claim 34, wherein said ferromagnetically conductive material in the core has a permeability of $\mu r$ 2,000–8,000.

36. The apparatus as claimed in claim 21, wherein said coil is wound 1–10 turns around the arc section of the core.

37. The apparatus as claimed in claim 36, wherein said coil is wound 2–8 turns around the arc section of the core.

38. The apparatus as claimed in claim 37, wherein said coil is wound 2–6 turns around the arc section of the core.

39. The apparatus as claimed in claim 21, wherein said coil comprises a metal strip or a wire, which is formed into a coil around the arc section of the core.

40. The apparatus as claimed in claim 39, wherein said coil includes copper or silver.

* * * * *